(12) United States Patent
Volk et al.

(10) Patent No.: US 11,497,222 B1
(45) Date of Patent: Nov. 15, 2022

(54) STACKABLE RETAINER FOR POULTRY HOCKS

(71) Applicant: Volk Enterprises, Inc., Turlock, CA (US)

(72) Inventors: Daniel J. Volk, Cumming, GA (US); Drew A. Volk, Turlock, CA (US)

(73) Assignee: Volk Enterprises, Inc., Turlock, CA (US)

( * ) Notice: Subject to any disclaimer, the term of this patent is extended or adjusted under 35 U.S.C. 154(b) by 0 days.

(21) Appl. No.: 17/473,097

(22) Filed: Sep. 13, 2021

(51) Int. Cl.
*A22C 21/00* (2006.01)

(52) U.S. Cl.
CPC ................. *A22C 21/0038* (2013.01)

(58) Field of Classification Search
CPC .................................................. A22C 21/0038
USPC ................................................ 452/174, 198
See application file for complete search history.

(56) References Cited

U.S. PATENT DOCUMENTS

| | | | |
|---|---|---|---|
| 4,739,538 A | 4/1988 | Volk | |
| 4,771,509 A * | 9/1988 | Volk | A22C 21/0038 452/176 |
| 5,102,370 A | 4/1992 | Volk | |
| 5,112,274 A | 5/1992 | Volk | |
| 5,181,880 A | 1/1993 | Volk | |
| 5,292,277 A * | 3/1994 | Volk | A22C 21/0038 452/176 |
| 5,380,241 A * | 1/1995 | Volk | A22C 21/0038 452/176 |
| 5,451,182 A * | 9/1995 | Volk | A22C 21/0038 452/176 |
| 5,498,201 A | 3/1996 | Volk | |
| 5,735,736 A | 4/1998 | Volk | |
| 5,749,778 A | 5/1998 | Volk | |
| 6,244,951 B1 * | 6/2001 | Leining | A22B 7/003 452/187 |
| 7,014,553 B1 | 3/2006 | Volk | |
| 7,175,518 B2 | 2/2007 | Volk | |
| 7,591,719 B1 | 9/2009 | Thompson | |

* cited by examiner

*Primary Examiner* — Richard T Price, Jr.
(74) *Attorney, Agent, or Firm* — Laurence P. Colton; Smith Tempel Blaha LLC (57) ABSTRACT

A poultry leg retainer for use with a poultry carcass having legs with hocks, the retainer having an anchor, a connecting leg, and a bridle portion. The anchor has an anchor beam that extends in a substantially transverse direction of the retainer. First and second outer ends of the anchor beam are pointed and upturned. The connecting leg is coupled on a distal end thereof with a central portion of the transverse anchor beam and extends in a longitudinal direction of the retainer substantially perpendicular to the transverse direction of the anchor beam. A curvilinear member of the bridal portion has a central portion that is coupled with the proximal end of the connecting leg and first and second arcuate portions that define first and second downwardly-facing openings, respectively, configured to engage first and second poultry hocks, respectively. The retainer is also configured to facilitate stacking of multiple retainers.

11 Claims, 5 Drawing Sheets

STACKABLE RETAINER FOR POULTRY HOCKS

BACKGROUND OF THE INVENTION

Technical Field

The present invention relates generally to a stackable retainer device for trussing or retaining the hocks of poultry carcasses to securely retain the legs in juxtaposition during processing, packaging, shipping and possibly cooking and relates more particularly to retainers, for engaging the hocks and body of a poultry carcass, that can be stacked together for storing, shipping, and user convenience.

Prior Art

As appreciated by those skilled in the art, the processing, packaging and shipping of poultry carcasses can be made easier by creating relative uniformity amongst trussed poultry carcasses. For example, if the hocks of poultry carcasses are protruding from the animal carcass, then the extending limbs can interfere with packaging machinery and tear the packaging material, which often is a thin polymer. Trussing the hocks, thereby holding the legs together close to the body, can help to avoid this problem. Additionally, trussing draws the poultry legs back and creates a visual impression that the poultry breast is larger, and therefore makes the trussed poultry more appealing to the purchaser. Further, it is easier to cook a trussed poultry carcass, especially on a rotisserie, as the legs will be retained against the body and not flop about. Similarly, as the poultry carcasses can be cooked more easily, there is an added benefit of trussing poultry carcasses to consumers, and this can be exploited by advertising by the retailer.

Over the years, many brackets, clamps, retainers, and similar devices have been developed for retaining or trussing the hocks of poultry carcasses during cooking, shipping, and processing, some in the past of metal and wire, but most recently of nylon or plastic. Not surprisingly, the prior art discloses many means for trussing the hocks of poultry carcasses. A few exemplary trussing devices are discussed below.

U.S. Pat. No. 4,739,538 to Volk discloses a retainer for poultry hocks having a central locking member cooperating with straps for positively securing poultry legs tightly against each of the hocks, together with anchors into kidney openings in the poultry backbone. U.S. Pat. No. 5,102,370 to Volk discloses a hock cap covering the entire hock wherein such a hock cap has a FIG. 8 structure with an ankle strap having a lower portion that engages the back side of the ankles. U.S. Pat. No. 5,112,274 to Volk discloses a snap-on ankle strap poultry-trussing device having a lower portion with an indent that extends upwardly between the exposed hocks of the carcass. The ankle strap is slipped over the exposed hocks, grasps the ankles of the poultry carcass, and holds them together. U.S. Pat. No. 5,181,880 to Volk discloses a method of trussing poultry by making slits in the skin and passing the hocks through the slits and then attaching a snap-on hock cap to hold the hocks together.

U.S. Pat. No. 5,498,201 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the hocks in juxtaposition. U.S. Pat. No. 5,735,736 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the legs substantially perpendicular to the retainer and parallel to each other. U.S. Pat. No. 5,749,778 to Volk discloses a retainer for poultry hocks that is formed as a ring of a thin unitary plastic material and has hinged flaps extending inward from opposite sides thereof. The poultry hocks are inserted through the ring to cause the flaps to bend outward and then to partially retract backward so that the edges of the flaps engage behind the hock knuckles, holding the thighs close to the body of the fowl. U.S. Pat. No. 7,175,518 to Volk discloses a retainer for poultry hocks that is formed as a unitary, plate-like member of resilient material that includes two openings for fitting over the hocks.

U.S. Pat. No. 7,014,553 to Volk discloses a device for retaining and trussing the hocks of poultry carcass in juxtaposition and proximal to the body during processing, packaging, shipping, storage, and/or cooking. The device may be constructed of a unitary, plate-like member of resilient material and includes two openings for fitting about and retaining the hocks, an anchor to be affixed to the poultry carcass, and a connecting means between the hock retaining members and the anchor. The connecting members provide a spring force to keep the hocks and thus the legs juxtaposed to the carcass and each other. U.S. Pat. No. 7,591,719 to Thompson discloses a retainer constructed as a unitary, plate-like member of resilient material, wherein the retainer includes a bridle having a resiliently flexible upper member connected at opposed ends to a lower semi-rigid spar, with a separator interconnecting the upper member and the spar at midpoints thereof. The upper member, spar, and separator define a pair of receiving openings or loops adapted to receive the hocks of the poultry legs. The retainer is preferably secured to the poultry carcass by an anchor having upturned ends that are adapted for engagement within the interior cavity of the poultry carcass, the anchor being connected in a depending relation to the bridle by connecting legs.

While the known prior art has advantages for certain situations, there is a constant need for poultry trussing devices that are: (1) less expensive to manufacture; (2) easier to mount on the hocks and easier to insert into the body of carcass; (3) easier to dismount from the hocks, (4) less costly to ship; (5) able to hold the hocks more securely; (6) able to be mounted automatically if desired; and (7) able to be neatly stacked when held as a plurality, or combinations of these, for ease of packaging, storing, transporting, and use. Thus, there is always a need for a hock retainer generally for trussing poultry carcasses and specifically for fitting about the hocks so as to hold the legs proximal to each other and to the body of the carcass. There also is always a need for a relatively simple device that can be manufactured simply and inexpensively, and easily is mounted on and dismounted from the hocks. There additionally is always a need for a hock retainer that is less labor-intensive to attach to the poultry and allows more throughput per worker. There further always is a need for a hock retainer that has less interaction or contact with packaging materials. There is also a need for a hock retainer that can be manufactured at reduced costs. It is to these needs and others that the present invention is directed.

BRIEF SUMMARY OF THE INVENTION

Briefly described, the present disclosure is a device for retaining and trussing the hocks of an eviscerated poultry carcass in juxtaposition to each other and proximal to the body during processing, packaging, shipping, storage, and/or cooking, a plurality of the devices being stackable together for storage, shipping, ease of use, etc. The retainer may be constructed as a unitary, plate-like or substantially planar member of resilient material.

The poultry leg retainer comprises an anchor, a connecting leg, and a bridle portion. The anchor comprises an anchor beam that extends in a substantially transverse direction of the retainer. The anchor beam comprises a central portion that is substantially parallel to the transverse direction of the retainer and first and second outer ends that are pointed and upturned. The connecting leg has a proximal end and a distal end. The distal end of the connecting leg is coupled with the central portion of the transverse anchor beam. The connecting leg extends in a longitudinal direction of the retainer that is substantially perpendicular to the transverse direction of the anchor beam. The bridle portion comprises a curvilinear member having a central portion and first and second arcuate portions. The central portion of the curvilinear member is coupled with the proximal end of the connecting leg. The first and second arcuate portions have proximal ends that are coupled with the central portion of the curvilinear member and have downturned distal ends pointing generally toward the anchor beam. The first and second arcuate portions have first and second arched configurations, respectively, that define first and second downwardly-facing openings, respectively, in the bridle portion that are configured to engage first and second hocks, respectively, of a poultry carcass.

In accordance with a representative embodiment, the first and second downwardly-facing openings are sized and shaped to engage first and second ankles, respectively, of the first and second hocks of the poultry carcass, respectively.

In accordance with a representative embodiment, the first arcuate portion arcs upwardly and outwardly as the first arcuate portion extends away from the proximal end of the first arcuate portion toward a middle portion of the first arcuate portion. The first arcuate portion arcs outwardly and downwardly as the first arcuate portion extends away from the middle portion toward the downturned distal end of the first arcuate portion. Similarly, the second arcuate portion arcs upwardly and outwardly as the second arcuate portion extends away from the proximal end of the second arcuate portion toward a middle portion of the second arcuate portion. The second arcuate portion arcs outwardly and downwardly as the second arcuate portion extends away from the middle portion of the second arcuate portion toward the downturned distal end of the second arcuate portion.

In accordance with a representative embodiment, the bridle portion further comprises an appendage, preferably a ring or partial ring, having first and second ends that are coupled to the first and second arcuate portions, respectively, and the appendage is configured to be pulled at a central portion of the appendage by a worker or machine when applying the retainer to the poultry carcass.

In accordance with a representative embodiment, the appendage is configured such that while the first and second pointed and upturned outer ends of the anchor beam are engaged with an internal portion of the poultry carcass, exertion of a pulling force on the central portion of the appendage by a worker or machine in the longitudinal direction of the retainer away from the anchor causes the first and second arcuate portions to flex outwardly, thereby causing widths of the first and second openings to temporarily widen from first widths to second widths. When exertion of the pulling force on the central portion of the appendage ceases, the widths of the first and second portions return to the first widths.

In accordance with a representative embodiment, the appendage is generally semi-circular in shape, and the first and second ends of the appendage are coupled to the first and second arcuate portions, respectively, at the middle portions of the first and second arcuate portions.

In accordance with a representative embodiment, the retainer comprises a material having an elastic quality to allow the retainer to be temporarily deformed by forces exerted on the retainer into a deformed state and to return to an undeformed state when the forces are removed.

In accordance with a representative embodiment, the anchor further has a front surface and a back surface. The front surface defines a protrusion that extends at least partially between the first pointed and upturned outer end and the second pointed and upturned end. The back surface of the anchor defines a groove that is complementary to the protrusion and that extends at least partially between the first pointed and upturned outer end and the second pointed and upturned outer end.

In accordance with a representative embodiment, the protrusion and the complementary groove of the retainer facilitate stacking of a plurality of the retainers by aligning the position and orientation of the retainers in the stack such that the groove of an upper retainer in the stack engages the protrusion in a lower adjacent retainer in the stack. An inventive concept of the anchor is that the anchor has front-back surface asymmetry so as to allow a plurality of the anchors to be efficiently stacked together. The asymmetric anchor readily engages with other similarly structured retainers of the present invention, for example, when a plurality of retainers is stacked flush against one another in a group, the front side of the anchor of one retainer nests comfortably within the back side of the anchor of an adjacent retainer. To accomplish this object, one side of the anchor has the protrusion and the other side of the anchor has the groove such that the protrusion of a first anchor on a first device can fit within the groove of a second anchor of a second device. The protrusion and groove can be structured to provide a friction fit between the protrusion of one anchor and the groove of another anchor such that a stack of devices will remain stacked until separated by a user.

The stackable feature allows the elimination of binding devices such as rubber bands to hold a plurality of retainers together. In the art, retainers often are shipped and stored in bundles of multiple retainers held together by rubber bands and the like. Rubber bands and other such binding devices can drop into a bird, causing contamination. Rubber bands and other such binding devices also can be a safety hazard for a number of reasons, such as by snapping off and hitting a worker in the eye, or by falling into and remaining in the bird's cavity thus making it way to the consumer and/or possibly creating a recall situation.

The stackable feature also has several additional advantages in the packaging and use of the retainers. For one example, the stackable feature can help automate packaging of the retainers during manufacture as the retainers can be stacked in a precise manner. For another example, the stackable feature can allow for a machine to be programmed to stack a certain number of retainers into a stack of retainers for packaging and shipping to the poultry processors, as the retainers do not need to be picked up by hand and wrapped in a rubber band. For yet another example, a stack of retainers can remain releasably connected in the user's hand while removing one retainer at a time, whereas when using a rubber band, the rubber band is removed from the stack leaving a pile of unconnected retainers in the user's hand In accordance with a representative embodiment, exertion of a pulling force on the central portion of the appendage by a worker or machine in the longitudinal direction of the retainer away from the anchor while the first and second pointed and upturned outer ends of the anchor beam are engaged with an internal portion of the poultry carcass causes:

(1) the first and second arcuate portions to flex outwardly in a direction away from the leg, thereby causing widths of the first and second openings to temporarily widen from first widths to second widths;

(2) the first and second pointed and upturned outer ends of the anchor beam that are engaged with the internal portion of the poultry carcass to flex downwardly in a direction away from the anchor beam; and (3) the leg to flex outwardly in a direction away from the poultry carcass.

These features, and other features and advantages of the present invention, will become more apparent to those of ordinary skill in the relevant art when the following detailed description of the preferred embodiments is read in conjunction with the appended drawings in which like reference numerals represent like components throughout the several views.

DETAILED DESCRIPTION OF PREFERRED EMBODIMENTS

The present invention provides an improved retainer or trussing device for the legs of eviscerated poultry, that is less labor-intensive to attach to the poultry, that allows more throughput per worker, that can be manufactured at reduced costs, and which device is stackable. Generally, the present invention is preferably formed as a single integral unit of nylon, plastic, or the like which may be readily produced by standard plastic injection molding techniques.

In the following detailed description, a few exemplary, or representative, embodiments are described to demonstrate the inventive principles and concepts. For purposes of explanation and not limitation, representative embodiments disclosing specific details are set forth in order to provide a thorough understanding of an embodiment according to the present disclosure. However, it will be apparent to one having ordinary skill in the art having the benefit of the present disclosure that other embodiments that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present disclosure.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an", and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings. For example, terms such as "over", "above", "below", "top", "bottom", "upper", and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art.

Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than electrical connectors (e.g., wires, bonding materials, etc.).

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

Figure 1:
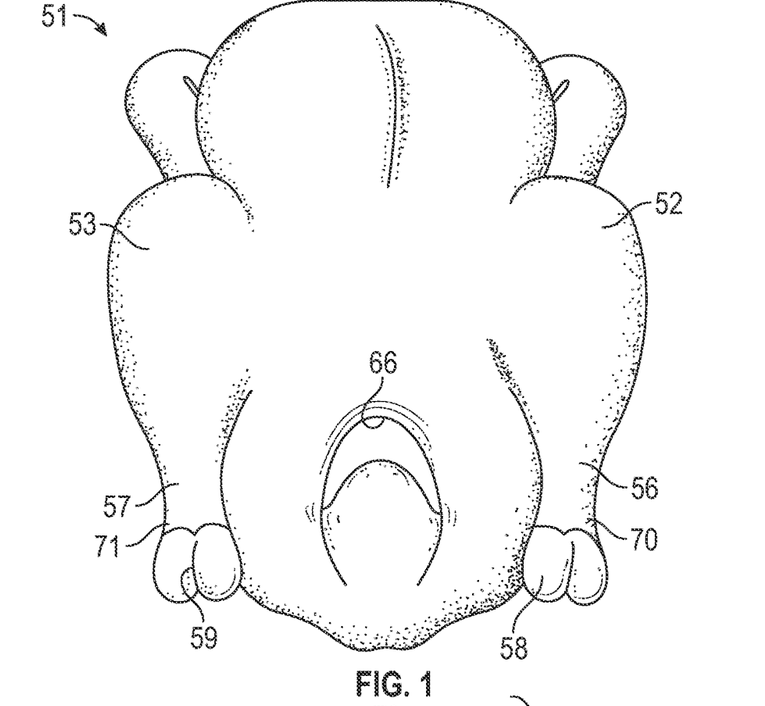
FIG. 1 is a front perspective view of a typical eviscerated poultry carcass as often viewed by the consumer.
Figure 2:
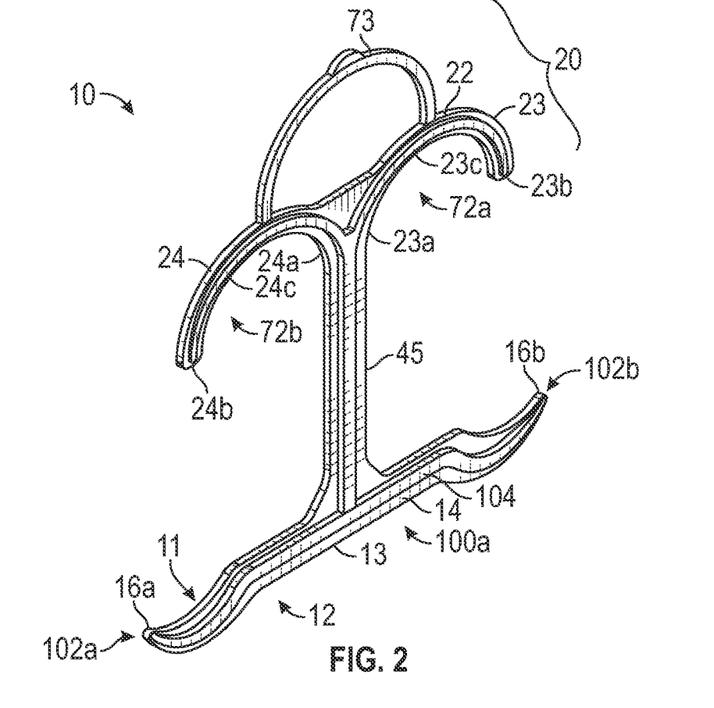
FIG. 2 is a front perspective view of an exemplary embodiment of the retainer of the present invention.
Figure 3:
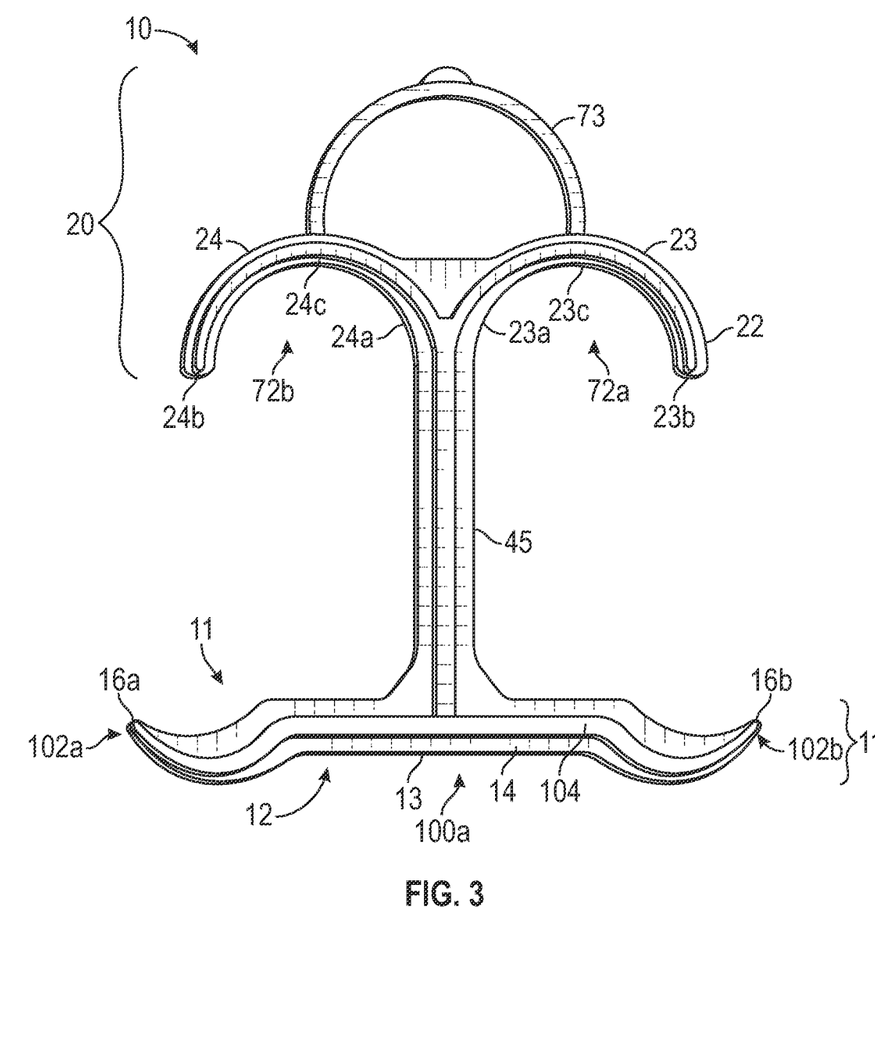
FIG. 3 is a top plan view of the retainer of FIG. 2.
Figure 4:
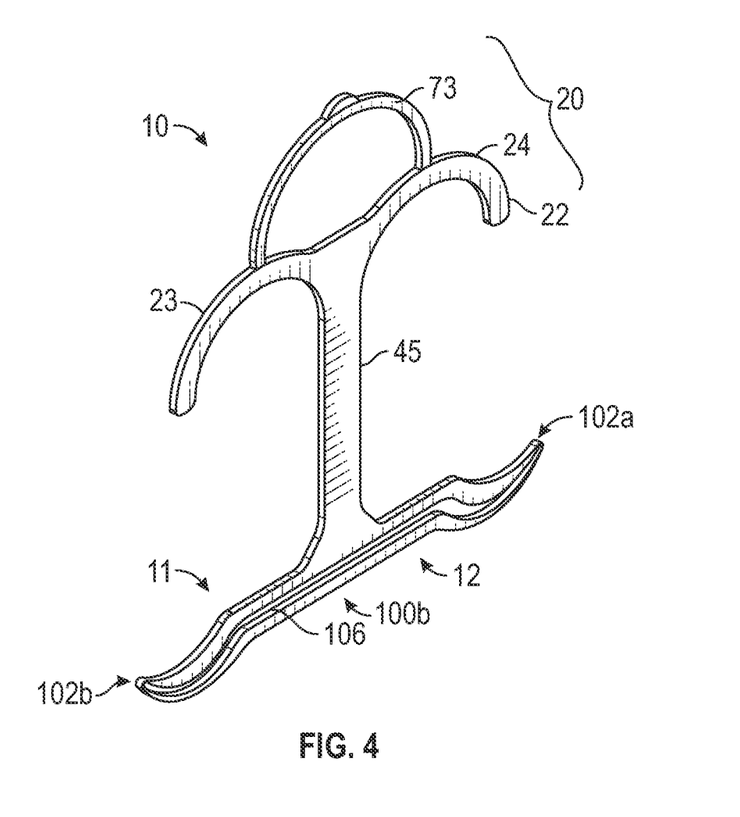
FIG. 4 is a side perspective view of the retainer of FIG. 2.
Figure 5:
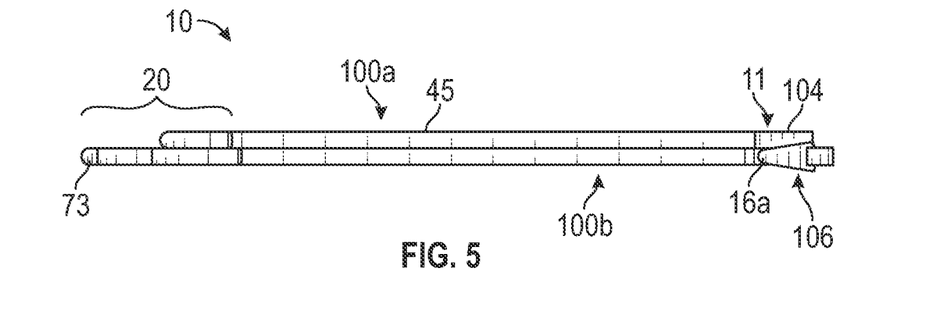
FIG. 5 is a side view of the retainer of FIG. 2.
Figure 6:
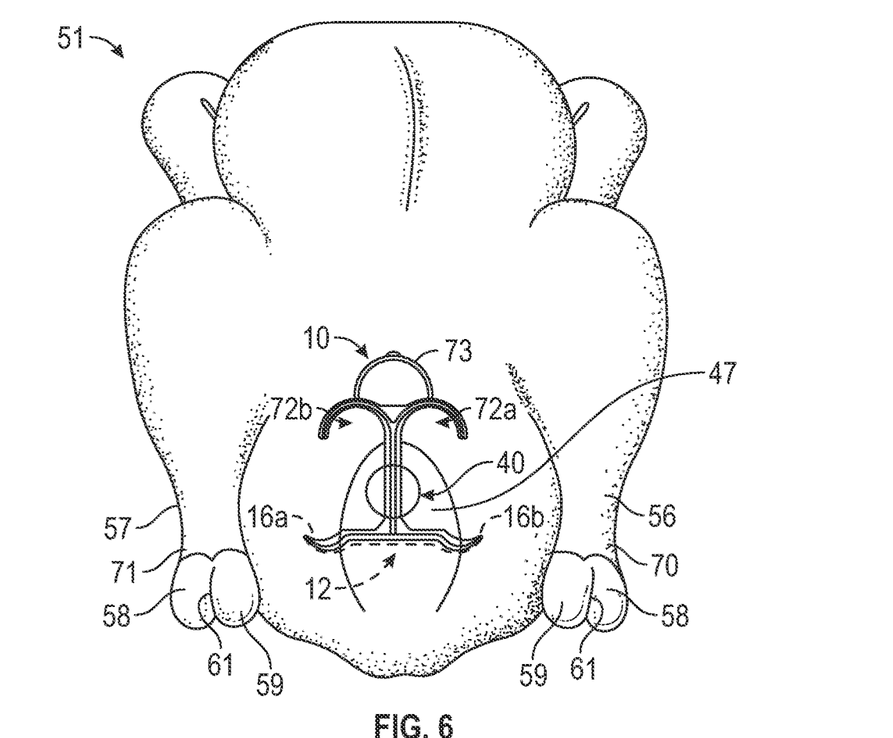
FIG. 6 is a during application view of the retainer relative to an eviscerated poultry carcass.
Figure 7:
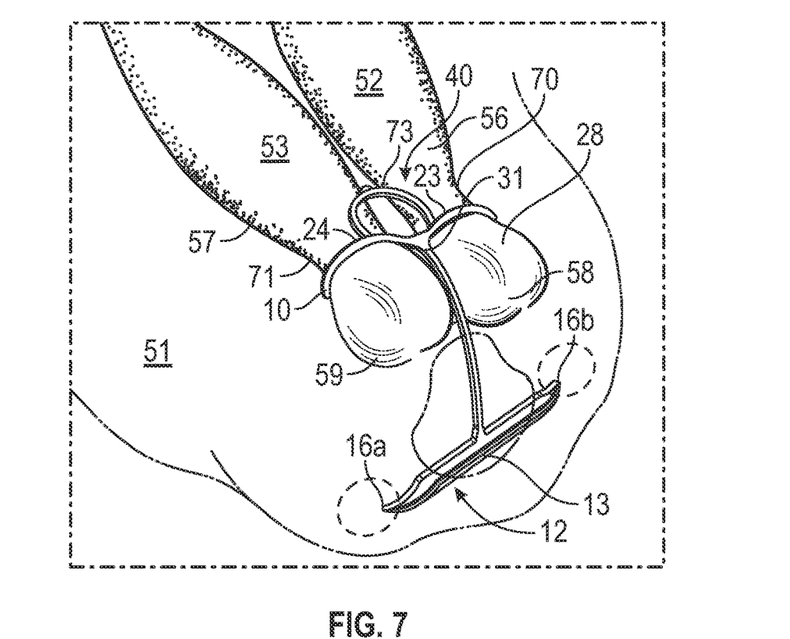
FIG. 7 is a post-application view of the retainer of FIG. 2 securing the hocks of an eviscerated poultry carcass.
Figure 8:
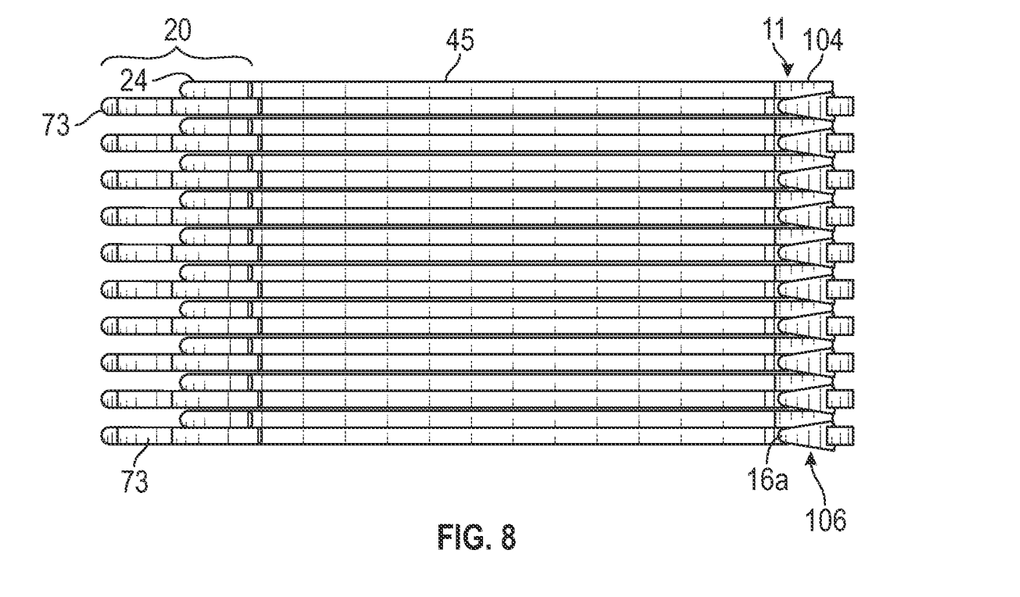
FIG. 8 is a side view of an embodiment of a plurality of retainers of the present invention in a stack.

FIG. 1 is a front perspective view of a typical eviscerated poultry carcass 51 as often viewed by the consumer. FIG. 2 is a front perspective view of an exemplary embodiment of the retainer 10 of the present invention. FIG. 3 is a top plan view of the retainer 10 of FIG. 2. FIG. 4 is a back perspective view of the retainer 10 of FIG. 2. FIG. 5 is a side view of the retainer 10 of FIG. 2. FIG. 6 is a during-application view of the retainer 10 relative to an eviscerated poultry carcass 51 of FIG. 1. FIG. 7 is a post-application view of the retainer 10 of FIG. 2 securing the hocks of the eviscerated poultry carcass 51 of FIG. 1. FIG. 8 is a side view of an embodiment of a plurality of retainers 10 of the present disclosure in a stack.

With reference to FIG. 2, retainer 10 of the present disclosure, in accordance with this embodiment, has an anchor portion 11 for anchoring retainer 10 into cavity 66 of carcass 51, and hock retaining means or bridle portion 20 that is designed to hold together exposed hocks 56, 57 of carcass 51 of FIG. 1, which can be particularly advantageous during processing, packaging, shipping, storing, and/or cooking.

In accordance with a representative embodiment, anchor 11 is asymmetrical in that the front surface 100a (FIGS. 2-3 front view) compared to the back surface 100b (FIG. 4 rear view) reveal an asymmetry (see FIG. 5, compare front 100a to back 100b), which is not only particularly advantageous for engaging retainer 10 to carcass 51 but also for engaging and stacking retainers 10n (FIG. 8). In particular, front surface 100a of the asymmetrical anchor 11 defines a protrusion 104 that extends from one upturned end 102a of anchor 11 to the other upturned end 102b of anchor 11 in the form of a ridge. FIG. 4 illustrates the back surface 100b of the asymmetrical anchor 11 and illustrates groove 106 corresponding to protrusion 104. Like protrusion 104, the corresponding groove 106 extends from the one upturned end 102a of anchor 11 to the other upturned end 102b on the back surface 100b, and is complementary to protrusion 104.

FIGS. 2-5 illustrate a representative embodiment of retainer 10 including bridle portion 20 and anchor 11, which are connected to each other by a resilient connecting leg 45. Bridle portion 20 comprises curvilinear member 22 having first and second arcuate portions 23 and 24, respectively. As shown in FIGS. 2 and 3, first and second arcuate portions 23 and 24, respectively, have proximal ends 23a and 24a, respectively, and downturned distal ends 23b and 24b, respectively. Proximal ends 23a, 24a are coupled with a central portion of curvilinear member 22a, which is coupled with a proximal end of connecting leg 45.

Arcuate portions 23, 24 arc upwardly and outwardly as they extend away from their proximal ends toward middle portions 23c, 24c of arcuate portions 23 and 24, respectively. Arcuate portions 23, 24 arc outwardly and downwardly as they extend away from middle portions 23c, 24c toward the downturned distal ends 23b, 24b of arcuate portions 23, 24. The arched configurations of arcuate portions 23, 24 defined first and second downwardly-facing openings 72a and 72b, respectively, that are configured to engage first and second ankles 70 and 71, respectively, of carcass 51. Curvilinear member 22 resembles an "m", or is generally m-shaped.

As shown in FIGS. 2 and 3, anchor beam 12 is formed of a straight central portion 13 including a generally rectangular plate 14 that may have reinforcing ribs along the top and bottom sides thereof. Upturned ends 102a, 102b, which are the outer ends 16a, 16b of anchor beam 12, are arcuate extensions of central portion 13. In accordance with this representative embodiment, upturned outer ends 102a and 102b, respectively, are pointed to facilitate penetration into carcass 51 during application of retainer 10. Protrusion 104 extends across the straight central portion 13 on the front side surface 100a at least partially between outer end 16a to outer end 16b. As discussed herein, asymmetrical anchor 11 with upturned ends 102a, 102b and protrusion 104 cooperates with the interior of carcass 51, typically in the kidney cavities (FIG. 7) or the ribs (not shown), to anchor retainer 10 within cavity 66.

The shape of curvilinear member 22 and the sizes and lengths of first and second arcuate portions 23 and 24, respectively, provide first and second downwardly-facing openings 72a and 72b, respectively, with sizes and shapes that are adapted to receive ankles 70 and 71, respectively, of carcass 51. This can be seen with reference to FIGS. 6 and 7. The distance between the proximal and distal ends 23a and 23b, respectively, of first arcuate portion 23 is substantially equal to the distance between the proximal and distal ends 24a and 24b, respectively, of second arcuate portion 24. This distance is substantially equal to the width of ankles 70 and 71, and is less than the width of knuckles 58, 59 and less than the width of hocks 56 and 57.

With reference to FIG. 6, the retainer 10 is shown in a pre-application state. More specifically, FIG. 6 illustrates retainer 10 anchored within cavity 66. As can be seen, anchor beam 12 is anchored within cavity 66 and connecting leg 45 extends outward from cavity 66. Bridle 20 remains outside of carcass 51. FIG. 7 shows retainer 10 in the post-application state and illustrates an eviscerated carcass 51 of a turkey, for example, having legs 52, 53 engaged by retainer 10.

Retainer 10 is intended for use with carcass 51, such as a turkey, chicken, or the like, and is employed to retain legs 52, 53 of such fowl tightly against the bird's body. Preferably, retainer 10 extends over the rear body opening with hocks 56, 57 of legs 52, 53 pressed together. Carcass 51 has the feet and lower legs removed at hocks 56, 57 of legs 52, 53. Hocks 56, 57 are larger in cross-section (diameter) than the leg bones immediately behind hocks 56, 57 (ankles 70, 71) and each include a pair of knuckles 58, 59 with crease or cleft 61 between knuckles 58, 59.

Application of retainer 10 to a bird is first carried out by inserting anchor beam 12 of retainer 10 preferably into the kidney holes adjacent the backbone of carcass 51 through a rear body opening into cavity 66. It should be noted that application of retainer 10 can be carried out by a worker and/or by a machine. Retainer 10 is tilted and one outer end 16a or 16b of anchor beam 12 is inserted into one of the kidney holes of the back structure of carcass 51. For purposes of discussion, it will be assumed that outer end 16a is inserted before outer end 16b is inserted, although the order in which the outer ends 16a, 16b are inserted does not matter. It will be appreciated that access to the backbone structure or the like is achieved through the rear body opening into cavity 66 after the carcass 51 has been eviscerated.

Following insertion of outer end 16a of anchor beam 12 in a kidney opening, retainer 10 then is moved substantially as far as possible toward that kidney opening such that the entire outer end 16a of anchor beam 12 extends through such opening. It will be appreciated that the flexibility of connecting leg 45 allows for movement of retainer 10 sufficiently into the kidney hole such that the other outer end 16b of anchor beam 12 may then be pivoted downwardly past the bone structure of the backbone so as to align the other outer end 16b of anchor beam 12 with the opposite kidney opening. Retainer 10 is then moved so that the other outer end 16b extends through the other kidney opening. In this position, retainer 10 is fully inserted into the carcass 51, as illustrated in FIG. 7, such that retainer 10 is firmly engaged with the backbone structure of the carcass 51. This provides a very secure anchor for retainer 10 so that bridle 20 may be affixed about hocks 56, 57 to tightly truss the same against the body of carcass 51 in close relation to the rear body opening 66. Alternatively, anchor beam 12 also may be secured to the internal portion of carcass 51 such as in the rib section.

After outer ends 16a, 16b have been inserted to engage retainer 10 with the internal portion of carcass 51, bridle 20 is engaged as follows. The worker or machine then moves hocks 56, 57 into contact or close proximity with one another while pulling on appendage 73 of bridle 20 in a generally upward direction away from anchor beam 12 to move first and second arcuate portions 23, 24, respectively, over and above knuckles 58, 59 and onto ankles 70, 71, respectively, of carcass 51. This seats ankles 70, 71 within first and second openings 72a, 72b, respectively, (FIG. 6) such that ankles 70, 71 are engaged with and pressed against lower surfaces of first and second arcuate portions 23 and 24, respectively.

During the process of pulling on appendage 73 of bridle 20 in the generally upward direction away from anchor beam 12 to move first and second arcuate portions 23, 24 above and over knuckles 58, 59, outer ends 16a, 16b of anchor beam 12 flex downward as they are pressed against the interior portion of carcass 51. This causes at least a portion of retainer 10 to temporarily deform and elongate, to allow arcuate portions 23, 24 to be pulled above and over knuckles 58, 59, respectively, and to be seated within openings 72a, 72b, respectively, against the ankles 70, 71, respectively. Also, due to the locations along arcuate portions 23, 24 at which opposite ends of appendage 73 are connected, pulling on appendage 73 in the generally upward direction away from anchor beam 12 causes arcuate portions 23, 24 to flex outwardly, i.e., in a direction away from the longitudinal direction of connecting leg 45, thereby temporarily widening openings 72a, 72b to facilitate passing arcuate portions 23, 24 over and above knuckles 58, 59 to seat them against ankles 70, 71. Then, removal of the pulling force on appendage 73 causes outer ends 16a, 16b and arcuate portions 23, 24 to return to their unflexed states, thereby causing arcuate portions 23 and 24 to be pressed firmly against ankles 70, 71 where they meet knuckles 58, 59. In this way, carcass 51 is a placed in a firmly retained state.

The material of retainer 10 preferably has an elastic quality and is shaped and dimensioned such that in the applied state shown in FIG. 7, an urging force is created by retainer 10 on hocks 56, 57 that maintains their position against carcass 51 and in juxtaposition to each other. Also, in the post-application state of retainer 10 shown in FIG. 7, connecting leg 45 of retainer 10 may be bent or flexed in a direction such that the longitudinal extent of connecting leg 45 is no longer linear. In this state, due to the flexible or elastic nature of connecting leg 45, connecting leg 45 will attempt to return to its original, unbent state. As connecting leg 45 is prevented from doing so by the presence of legs 52, 53, bridle 20 keeps hocks 56, 57, and thereby legs 52, 53, in constant force and thereby held against carcass 51. Further, connecting leg 45 acts like a spring such that if a sudden jolt forces legs 52, 53 to rise, connecting leg 45 will react like a spring, thus providing a force to legs 52, 53 to return them to their original, proximal positioning. Such a system is particularly useful in the processing of poultry in which carcasses are tumbled in a spin chill to cool the poultry and unconstrained legs are apt to become damaged.

When the first and second pointed and upturned outer ends 16a, 16b, of anchor beam 12 are engaged with an internal portion of carcass 51 as shown in FIG. 6, exertion of a pulling force on the central portion of appendage 73 by a worker or machine in the longitudinal direction of retainer 10 away from anchor 11 causes the following actions to occur: (1) first and second arcuate portions 23, 24 flex outwardly in a direction away from connecting leg 45, thereby causing widths of first and second downwardly-facing openings 72a, 72b to temporarily widen from first widths to second widths; (2) first and second pointed and upturned outer ends 16a, 16b of anchor beam 12 that are engaged with the internal portion of poultry carcass 52 flex downwardly in a direction away from anchor beam 12; and (3) connecting leg 45 flexes outwardly in a direction away from poultry carcass 51. These actions together allow first and second arcuate portions 23, 24 to be moved over and above knuckles 58, 59 and onto ankles 70, 71 of poultry carcass 51 to position ankles 70, 71 within first and second downwardly-facing openings 72a, 72b and seat ankles 70, 71 on lower surfaces of first and second arcuate portions 23, 24.

Preceding the application of retainer 10 to carcass 51, the bird's tail is preferably folded up under legs 52, 53 and across rear body opening to cavity 66 to thus at least partly seal rear body opening to cavity 66 by pressure of retained legs 52, 53 thereon. Alternatively, owing to the resiliency of retainer 10 elements, the tail may be tucked under legs 52, 53 subsequent to their securement in bridle 20. The trussed bird is then in condition for further processing or sale. Such further processing often includes freezing of the bird and packaging of same by a transparent polymer skin or cover tightly molded to the exterior of the bird. The trussed condition of legs 52, 53 in the above-described position with the tail tucked thereunder provides a relatively smooth configuration that is well adapted to receive a plastic wrapper or the like. In use the wrapper is removed by the cook and after defrosting of a frozen bird the tail may be removed from the illustrated position of FIG. 7 for stuffing the bird and then again tucked under legs 52, 53 to seal the rear body opening to retain stuffing or filling within body cavity 66 of the bird.

As discussed above and shown in FIG. 4, anchor 11 also defines groove 106 corresponding to the protrusion 104 that extends from one upturned end 102a of the anchor 11 to the other upturned end 102b, but on the back surface 100b of anchor beam 12. As discussed above, protrusion 104 on front surface 100a and complementary groove 106 on back surface 100b serve as an alignment means for stacking or manipulating a plurality of retainers 10 in a predetermined orientation and in a flush manner, such as in a stack or pack for transport and sale (see FIG. 8).

FIG. 8 illustrates how a plurality of retainers 10 can be placed in a stack, wherein protrusion 104 of one retainer 10 is inserted into the complementary groove 106 on a neighboring retainer 10 in a predetermined orientation and in a flush manner, such as in a stack or pack for transport and sale. In certain exemplary embodiments, cooperation and nesting as between protrusion 104 on front surface 100a and complementary groove 106 on back surface 100b provides sufficient friction to retain a plurality of retainers 10n in a stack with minimal packaging or bands (rubber or otherwise). In other words, protrusion 104 of one retainer 10 fits within and cooperates with groove 106 of another retainer 10 whereby retainers 10 can be more easily and efficiently stacked together for shipping and handling. As taught herein, protrusion 104 and groove 106 can be structured and manufactured to provide a friction fit that will retain a protrusion 104 of a first retainer within a groove 106 of a second retainer 10, yet also will allow the two retainers to be separated by a person for individual insertion into a carcass 51.

The preferred material for the present invention is nylon with a thickness of up to approximately 0.30 inches, and preferably between 0.03 and 0.15 inches. This thickness range provides sufficient rigidity for retainer while permitting the resilient components of retainer to be adequately deformable via their narrow cross-section. Plastics and other polymers also are suitable and can be selected by those of ordinary skill in the art based on the use of retainer. For example, a high melting temperature material can be used for retainers intended for use in cooking, while low melting temperature materials can be used for retainers intended only for packaging and display. Further, the structure of the present invention allows the use of less material than prior art trussing devices, saving on material costs and disposal costs and bulk.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A poultry leg retainer for use with poultry having legs with hocks, the retainer comprising:
   an anchor comprising an anchor beam that extends in a substantially transverse direction of the retainer, the anchor beam comprising a central portion that is substantially parallel to the transverse direction of the retainer, the anchor beam further comprising first and second outer ends that are pointed and upturned;
   a connecting leg having a proximal end and a distal end, the distal end being coupled with the central portion of the anchor beam, the connecting leg extending in a longitudinal direction of the retainer that is substantially perpendicular to the transverse direction of the anchor beam; and
   a bridle portion comprising a curvilinear member having a central portion and first and second arcuate portions, the central portion of the curvilinear member being coupled with the proximal end of the connecting leg, the first and second arcuate portions having proximal ends that are coupled with the central portion the curvilinear member and downturned distal ends, the first and second arcuate portions having first and second arched configurations, respectively, that define first and second downwardly-facing openings, respectively, in the bridle portion, wherein the first and second downwardly-facing openings are configured to engage first and second hocks, respectively, of a poultry carcass.

2. The poultry leg retainer of claim 1, wherein the first and second downwardly-facing openings are sized and shaped to engage first and second ankles of the first and second hocks, respectively.

3. The poultry leg retainer of claim 2, wherein the first arcuate portion arcs upwardly and outwardly as the first arcuate portion extends away from the proximal end of the first arcuate portion toward a middle portion of the first arcuate portion, and wherein the first arcuate portion arcs outwardly and downwardly as the first arcuate portion extends away from the middle portion toward the downturned distal end of the first arcuate portion.

4. The poultry leg retainer of claim 3, wherein the second arcuate portion arcs upwardly and outwardly as the second arcuate portion extends away from the proximal end of the second arcuate portion toward a middle portion of the second arcuate portion, and wherein the second arcuate portion arcs outwardly and downwardly as the second arcuate portion extends away from the middle portion of the second arcuate portion toward the downturned distal end of the second arcuate portion.

5. The poultry leg retainer of claim 2, wherein the bridle portion further comprises an appendage having first and second ends that are coupled to the first and second arcuate portions, respectively, the appendage being configured to be pulled at a central portion of the appendage by a worker or machine when applying the retainer to the poultry carcass.

6. The poultry leg retainer of claim 5, wherein the appendage is configured such that when the first and second pointed and upturned outer ends of the anchor beam are engaged with an internal portion of the poultry carcass, exertion of a pulling force on the central portion of the appendage by a worker or machine in the longitudinal direction of the retainer away from the anchor causes the first and second arcuate portions to flex outwardly, thereby causing widths of the first and second openings to temporarily widen from first widths to second widths, and wherein when exertion of the pulling force on the central portion of the appendage ceases, the widths of the first and second portions return to the first widths.

7. The poultry leg retainer of claim 5, wherein the appendage is generally semi-circular in shape, the first and second ends of the appendage being coupled to the first and second arcuate portions, respectively, at the middle portions of the first and second arcuate portions.

8. The poultry leg retainer of claim 1, wherein the retainer comprises a material having an elastic quality to allow the retainer to be temporarily deformed by forces exerted on the retainer into a deformed state and to return to an undeformed state when the forces are removed.

9. The poultry leg retainer of claim 1, wherein the anchor further has a front surface and a back surface, the front surface of the anchor defining a protrusion that extends at least partially between the first pointed and upturned outer end and the second pointed and upturned end, and wherein the back surface of the anchor defines a groove complementary to the protrusion, the groove extending at least partially between the first pointed and upturned outer end and the second pointed and upturned outer end.

10. The poultry leg retainer of claim 9, wherein the protrusion and the complementary groove of the retainer facilitate stacking of a plurality of the retainers by aligning the position and orientation of the retainers in the stack such that the groove of an upper retainer in the stack engages the protrusion of a lower adjacent retainer in the stack.

11. The poultry leg retainer of claim 2, wherein the bridle portion further comprises an appendage having first and second ends that are coupled to the first and second arcuate portions, respectively, the appendage being configured to be pulled at a central portion of the appendage by a worker or machine when applying the retainer such that when the first and second pointed and upturned outer ends of the anchor beam are engaged with an internal portion of the poultry carcass, exertion of a pulling force on the central portion of the appendage by a worker or machine in the longitudinal direction of the retainer away from the anchor causes:
   a) the first and second arcuate portions to flex outwardly in a direction away from the connecting leg, thereby causing widths of the first and second openings to temporarily widen from first widths to second widths;
   b) the first and second pointed and upturned outer ends of the anchor beam that are engaged with the internal portion of the poultry carcass to flex downwardly in a direction away from the anchor beam; and c) the connecting leg to flex outwardly in a direction away from the poultry carcass.

\* \* \* \* \*